W. WENTZ.
PACKING WHEEL FOR LISTERS.
APPLICATION FILED FEB. 15, 1915.
1,165,735.
Patented Dec. 28, 1915.
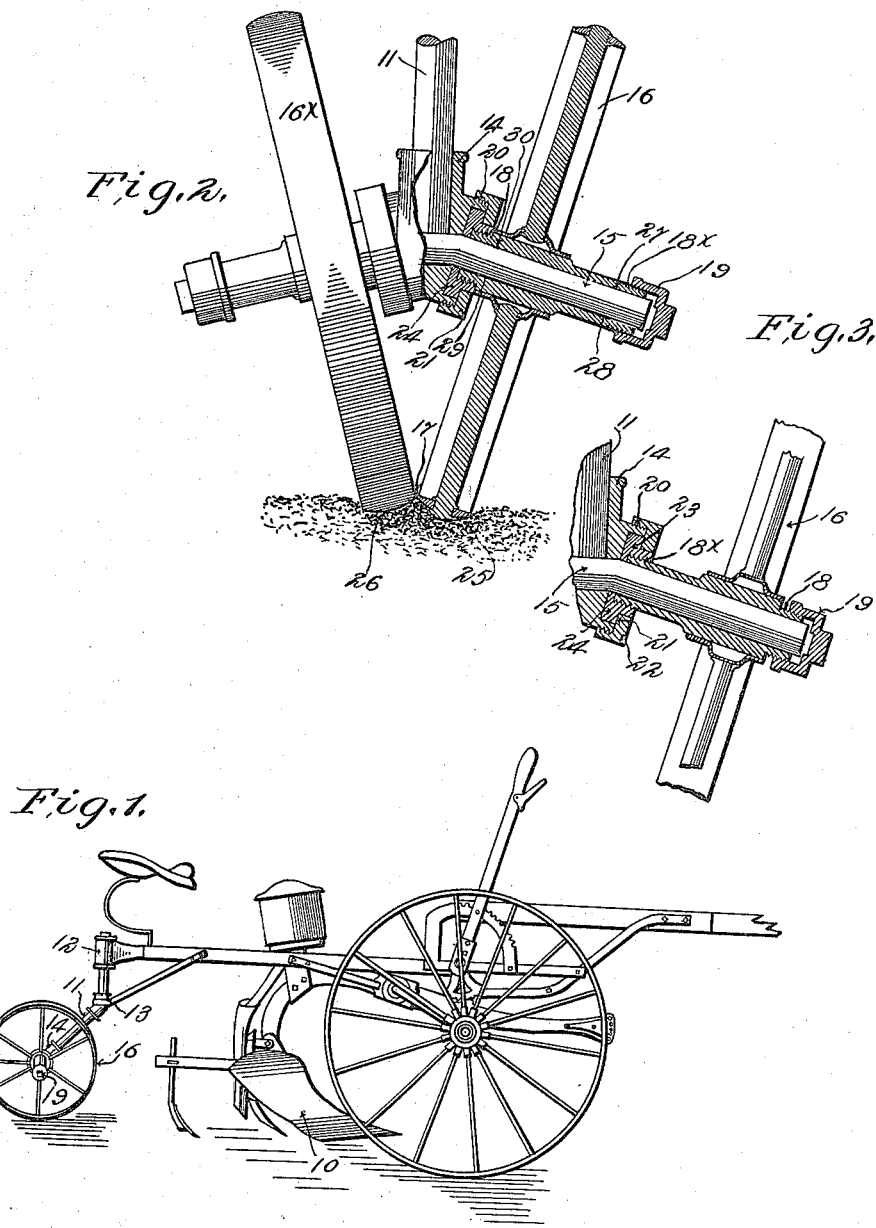

UNITED STATES PATENT OFFICE.

WILLIAM WENTZ, OF LEON, KANSAS.

PACKING-WHEEL FOR LISTERS.

1,165,735.  Specification of Letters Patent.  Patented Dec. 28, 1915.

Application filed February 15, 1915.  Serial No. 8,376.

*To all whom it may concern:*

Be it known that I, WILLIAM WENTZ, a resident of Leon, in the county of Butler and State of Kansas, have invented certain new and useful Improvements in Packing-Wheels for Listers, of which the following is a description, reference being had to the accompanying drawings, which form a part of this specification.

The objects of my invention, are as follows: First. To overcome the irregular wear on the journal by equalizing the pressure on its lower side. Second. To adjust the position of packing wheels to conform to certain kinds and conditions of ground. Third. To pack the ground solid on the listed seed. Fourth. To prevent dust from attacking the journals. Fifth. To allow for adjustment and reversal of wheels.

In the drawings, Figure 1. is a side elevation of a lister showing at the rear a packing wheel embodying the principles of my invention. Fig. 2. shows a rear elevation of the packing wheels with portions in section for a more complete understanding of the invention. Fig. 3. shows a sectional view of one wheel reversed on the axle.

Similar numerals of reference indicate corresponding parts in all the figures of the drawings.

Referring to the drawings, in Fig. 1. is seen the lister 10. In the rear at 11 is seen a shaft which turns or swivels in the parts 12 and 13 of the frame of the lister. The shaft 11 terminates in a holder 14; through this holder 14 passes an axle 15 as seen in Fig. 2. The spindle ends of the axle 15 are bent downwardly so that the two packing wheels 16 and 16ˣ will rotate on the axle 15 in oppositely inclined manner as seen in Fig. 2 and be in contact with each other at 17. In Fig. 1. only one wheel 16 is seen, the wheel 16ˣ seen in Fig. 2 is directly behind wheel 16 in Fig. 1. The hub of each wheel is threaded alike at both ends as seen at 18 and 18ˣ. A hub cap 19 is screwed on the hub closing the end and preventing dust from getting into the bearing. The holder 14 is threaded at 20 and a dust cap 21 screwed thereon as seen in Figs. 2 and 3. The dust cap 21 has a shoulder 22 which bears against the flange 23 of the inner collar 24, said inner collar 24 being screwed to the hub as seen at 18 in Fig. 2 and at 18ˣ in Fig. 3.

It will be seen from the above description and by reference to the various drawings that the inclined positions of the packing wheels are maintained at all times by the downward dip of the axle 15. The ground pressure at 25 on wheel 16 and at 26 on wheel 16ˣ, which would tend to produce greater wear at 27 than at 28, and at 29 than at 30 is equalized; the contact of the wheels at 17, holding the wheels in proper relation with respect to the spindles of axle 15.

Slight adjustment of the wheels can be obtained by tightening or loosening the dust cap 21 and collar 24. It will be observed that it is practically impossible for dust to get into the journals and cause wear. In Fig. 3 the wheel 16 is shown reversed, the advantages of the double threaded hub ends being apparent, the cap 19 and collar 24 are shown in position. The distance from the threaded end 18ˣ to the center line of the wheel is greater than from the end 18, hence the tire 16 as in Fig. 3 would not be in contact with its mate as in Fig. 2, this adjustment is of advantage in listing certain grounds.

It will readily be seen that the ground is well compressed by the packing wheels 16 and 16ˣ under all conditions, this helps to conserve moisture and also prevents insects attacking the seed thus insuring a perfect stand.

Such other modifications may be employed as are within the scope of the appended claims.

Having fully described my invention, what I now claim as new and desire to secure by Letters Patent, is:

1. In combination in a lister, means attached to the frame of said lister for supporting the holder of an axle having two downwardly bent spindles, oppositely inclined packing wheels mounted on said spindles, the hub of each packing wheel projecting for unequal distances from opposite sides of said wheel and being threaded alike at each end, a collar screwed on the inner end of each hub, said collar engaging a dust cap screwed on the holder; each of said packing wheels being reversible on its spindle for adjustment purposes, in which event the opposite threaded hub end is secured to the holder by means of said collar and dust cap.

2. In combination in a lister, a shaft attached to the frame of said lister, said shaft terminating in a holder through which passes an axle having its outer spindle ends downwardly bent, a pair of oppositely inclined packing wheels rotating on the spindles of the axle, the hub of each wheel projecting for unequal distances from opposite sides of said wheel and being threaded alike at both ends, a cap screwed on the outer end of the hub and a collar screwed on the inner end of the hub, adjacent the shaft holder, to which it is secured by an adjustable dust cap screwed on said holder.

WILLIAM WENTZ.

Witnesses:
W. S. MARSHALL,
M. A. DEDRICK.

Copies of this patent may be obtained for five cents each, by addressing the "Commissioner of Patents, Washington, D. C."